United States Patent Office 2,828,612
Patented Apr. 1, 1958

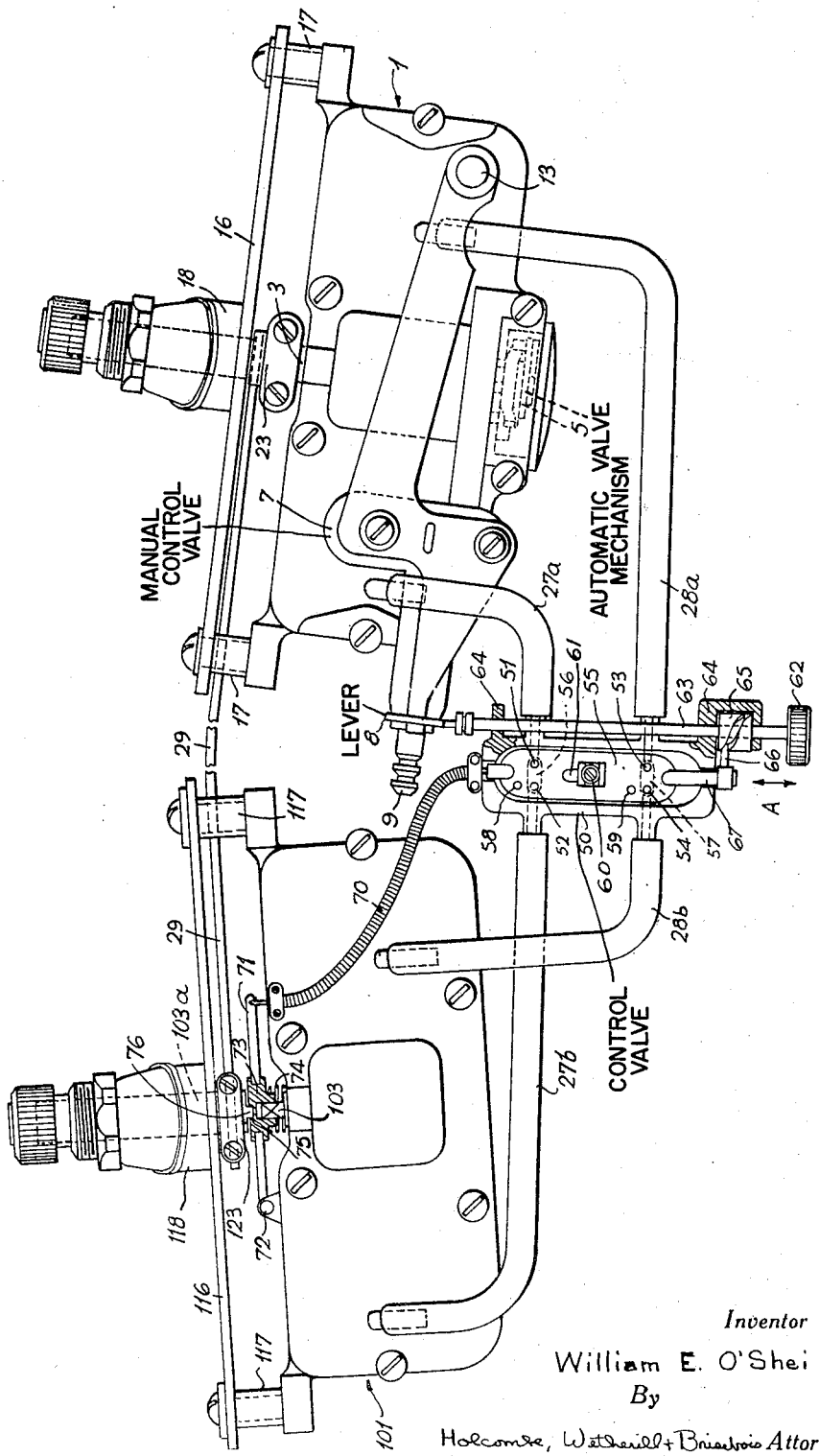

2,828,612
WINDSCREEN WIPER APPARATUS

William Edward O'Shei, London, England

Application November 19, 1953, Serial No. 393,137

Claims priority, application Great Britain November 21, 1952

6 Claims. (Cl. 60—97)

The present invention relates to windscreen wiper apparatus of the kind in which plural wiper blades are mechanically coupled so as to operate in unison and are driven by plural differential fluid pressure motors of which the piston chambers are interconnected in parallel, the supply of differential fluid pressure thereto being controlled by a single automatic control valve. An example of such apparatus is described in my co-pending British application No. 28,264/1952 (U. S. A. Serial No. 390,692 filed November 6, 1953).

Although the dual wiper system described in the above-mentioned specification requires two motors for ensuring that the system will operate under all conditions, there are occasions when the friction between the wiper blades and the windscreen is sufficiently low for both wiper blades to be operated by a single motor. Such conditions of low friction occur when the windscreen is completely wet, for example during a heavy storm, when a faster speed of movement of the blade is desirable to maintain the clearest possible vision.

According to the present invention, a dual or plural wiper system of the kind above referred to is provided with means for disconnecting the second motor, or one or more of the auxiliary motors, from the supply of suction so that the dual or plural system is actuated by one motor, or some of the motors, only. By this means the volume of air which has to be evacuated at each stroke of the wiper system is reduced, and consequently the speed at which the system can operate is increased.

Considering the invention as applied to a dual wiper system, when the second motor is disconnected from the source of suction, opposite sides thereof are, in one embodiment, simultaneously vented to the atmosphere so that the second motor will be reciprocated back and forth without restriction. When using motors of the oscillating paddle or piston type, some friction will obviously have to be overcome in moving the piston or paddle of the auxiliary motor, but this is relatively low and can easily be overcome by the single motor when the friction between the wiper blades and the windscreen is low. However, if desired, the second motor, or both motors, may be of the diaphragm type, whereby the friction to be overcome in the second motor, when driven by the first motor, will be substantially zero.

The windscreen wiper apparatus may be controlled by two manual control valves, one controlling the starting and stopping of the system and the other either the "slow" or "fast" speeds. The two valves may be interconnected so as to be operable by a common control knob, for example by a push-pull and a rotary movement thereof.

Alternatively, a single control valve may be used which may have three positions, namely a "stop" position in which the suction is applied to one side only of the first motor to hold the blades stationary in a parked position, a "run" position in which the suction is applied to both motors via the automatic control valve to actuate both motors to drive the wipers, and a "fast" position in which the suction is applied through the automatic control valve only to the first motor, the second motor being disconnected from the source of suction and being vented to atmosphere.

In another embodiment, the movement of the control valve to the "fast" position may cause the second motor, or the auxiliary motors, to be declutched or disengaged from the wiper system so that, when operating with only one motor the wiper blades can move without also moving the other motor or motors.

In order that the invention may be more clearly understood, reference will now be made to the accompanying drawing which shows a plan view of a windscreen wiper apparatus as described in my aforesaid co-pending application, modified according to this invention.

The windscreen wiper apparatus shown in the drawing is described in detail in my aforesaid co-pending application Serial No. 390,692 and will be described herein only insofar as is necessary for the understanding of the present invention, the parts being referred to by the same reference numerals as used in the aforesaid co-pending application. The apparatus comprises a master suction-operated motor 1 and an auxiliary suction-operated motor 101. The master motor 1 is of the oscillating paddle type and is of conventional construction, the oscillating paddle moving in a motor housing of arcuate shape to rock the motor shaft 3, reversal of the motor shaft at the end of each paddle stroke being controlled by an automatic valve mechanism generally indicated at 5.

The motor housing is also provided with a manually controlled valve 7 which, when in its "stop" position, continuously applies suction, which is fed to the motor through the connection 9, to one side of the motor to park the paddle at that side, and when in its "on" position, applies the suction through the automatic valve 5 to cause the motor to operate. The manual control valve 7 is actuated by the movement of the lever 8 mounted for pivotal movement about the connector 9.

The motor 1 is connected by spacers 17 to a bridge-piece 16 carrying the bushing 18 by which the motor may be assembled to the vehicle body.

The auxiliary motor 101 is constructed in a manner similar to the master motor 1 except that it is not provided with automatic valve mechanism 5 for reversing the movement of the motor paddle nor is it provided with a manual control valve 7. The movement of the paddle of the auxiliary motor 101 is controlled by the operation of the automatic and manual valves of the master motor, opposite sides of the paddle chamber of the motor 101 being connected in parallel with the corresponding opposite sides of the piston chamber of the motor 1 by means of the tubes 27, 28. In order to ensure that both motor shafts 3 and 103, and consequently both windscreen wiper blades, will move in unison, levers 23 and 123 are secured respectively to the shafts 3 and 103 and interconnected by a link 29.

In order to achieve dual speed operation the tubes 27 and 28 connect the two motors through a further control valve indicated at 50. This control valve comprises a body portion having a surface constituting a valve seating in which are formed ports 51, 52, 53 and 54 arranged as shown and connected respectively with the parts 27a, 27b and 28a, 28b of the connecting tubes. Slidable on this valve face, in the directions indicated by the arrow A, is a valve member 55. The surface of the valve member which moves over the valve seating is provided with two transverse cavities 56, 57 which, when the valve is in the position shown, respectively interconnect the ports 51, 52 and 53, 54 to connect the two parts of the tubes 27 and 28 together. The valve member 55 is also provided with two through apertures 58, 59 which, when the valve member 55 is moved to its forward position, respectively overlie the ports 52 and 54 and thus vent both sides of the auxiliary motor 101 to the atmosphere. In this position of the valve the ports 51 and 53 are sealed off. Thus when the valve is in this forward position the operating suction will only be applied to the master motor 1, the auxiliary motor being vented to the atmosphere, whilst when the valve is in its rearward position suction is applied to both the master and auxiliary motors in parallel.

The valve member 55, which may be retained on the valve seat by a spring held against the valve member by a screw 60 passing through a slot 61 therein, may be actuated by a separate control member, but preferably it is interlinked with the control member for the manual valve 7 so that only a single actuating knob is necessary. This knob is shown in the drawing by reference 62 at the end of a rod 63 slidable in bearings 64 on the body 50 and connected at its inner end to the lever 8 so that the valve 7 can be actuated by a push-pull action on the knob 62. Keyed to the rod 63 so as to be rotatable therewith but longitudinally slidable thereon, is a helical cam member 65. The helical groove in this cam member is engaged by a finger 66 on a member 67 connected to the valve member 55, whereby rotation of the cam member will cause the valve member 55 to be moved to either of its two positions. Movement of the cam member can be effected by rotating the knob 62 without changing the longitudinal position thereof.

Alternatively, or in addition, to venting the auxiliary motor 101 when the valve member 55 is in its forward position, the forward movement of the valve member 55 may be used to disengage a clutch between the auxiliary motor 101 and the portion 103a of the wiper shaft which projects through the associated bushing 118. Thus when the auxiliary motor 101 is disconnected from the suction supply, the wiper shaft 103a can be oscillated, without restriction by the motor 101. For example, as shown in the drawing, the valve member 55 may be connected by a flexible cable 70 to a lever 71 pivoted at 72 on the motor 101, movement of the lever actuating a collar 73 keyed to but slidable on the rocker shaft 103. The collar 73 is spring pressed by a spring 74 in a direction to urge the transverse groove 75 on the end thereof into engagement with the transverse ridge 76 on the inner end of the wiper shaft 103a. When the valve 55 is in its forward position, the lever 71 is actuated to move the collar 73 into the disengaging position, the drive between the motor and the wiper shaft 103a being automatically reengaged when the valve 55 is returned to its rearward or "slow" position.

In the case of large windscreens it may be desirable to fit more than two wiper blades. In this case two or more auxiliary motors may be provided which are connected to the master motor through a valve so that the auxiliary motors will be operated by the fluid pressure controlled by the automatic valve of the master motor, or be disconnected from the source of differential fluid pressure as above described.

I claim:
1. Windscreen wiper apparatus comprising at least two double-acting suction motors, means mechanically coupling said motors to reciprocate back and forth in unison, an automatic valve actuated by a first of said motors for controlling the supply of suction to opposite sides of said first motor to cause the latter to operate, a first pair of tubes respectively connecting opposite sides of said first motor to two ports in a control valve, a second pair of tubes respectively connecting opposite sides of a second motor to two further ports in said control valve, said control valve including a valve member movable from a first position in which the ports are interconnected in pairs so that opposite sides of said first and second motors will be connected in parallel, to a second position in which the ports connected to said first pair of tubes are sealed off and the ports connected to said second pair of tubes are vented to the atmosphere.

2. Apparatus as claimed in claim 1, including also valve means for controlling the supply of suction to said automatic valve for starting and stopping the operation of said first motor, and a single control member for actuating both said control valve and said valve means.

3. Apparatus as claimed in claim 2, wherein said single control member is movable both axially and rotationally, one of said movements actuating said control valve and the other of said movements actuating said valve means.

4. Windscreen wiper apparatus comprising at least two double-acting suction motors, means mechanically coupling said motors to reciprocate back and forth in unison, an automatic valve actuated by a first of said motors for controlling the supply of suction to opposite sides of said first motor to cause the latter to operate, a first pair of tubes respectively connecting opposite sides of said first motor to two ports in a control valve, a second pair of tubes respectively connecting opposite sides of a second motor to two further ports in said control valve, said control valve including a valve member movable from a first position in which the ports are interconnected in pairs so that opposite sides of said first and second motors will be connected in parallel, to a second position in which the ports connected to said first pair of tubes are sealed off, and means actuated by said valve member for uncoupling said coupling means when the valve member is moved to said second position.

5. Apparatus as claimed in claim 4, including also valve means for controlling the supply of suction to said automatic valve for starting and stopping the operation of said first motor, and a single control member for actuating both said control valve and said valve means.

6. Apparatus as claimed in claim 5, wherein said single control member is movable both axially and rotationally, one of said movements actuating said control valve and the other of said movements actuating said valve means.

References Cited in the file of this patent

UNITED STATES PATENTS

| | | |
|---|---|---|
| 1,645,592 | Folberth et al. | Oct. 18, 1927 |
| 2,326,686 | Rutledge | Aug. 10, 1943 |
| 2,581,010 | Findley et al. | Jan. 1, 1952 |
| 2,616,264 | Grant et al. | Nov. 4, 1952 |

FOREIGN PATENTS

| | | |
|---|---|---|
| 241,234 | Great Britain | Oct. 12, 1925 |
| 383,877 | Great Britain | Nov. 24, 1932 |